(12) United States Patent
Brown et al.

(10) Patent No.: US 8,272,683 B2
(45) Date of Patent: Sep. 25, 2012

(54) VEHICLE ROOF ASSEMBLY

(75) Inventors: Joseph R. Brown, Livonia, MI (US); Mark D. Snyder, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 12/953,542

(22) Filed: Nov. 24, 2010

(65) Prior Publication Data

US 2012/0126583 A1  May 24, 2012

(51) Int. Cl.
*B60J 7/00* (2006.01)
(52) U.S. Cl. .................................. 296/216.07; 296/214
(58) Field of Classification Search ........ 296/216.06–216.08, 214, 218
See application file for complete search history.

(56) References Cited

U.S. PATENT DOCUMENTS

| | | | | |
|---|---|---|---|---|
| 2,022,718 A | * | 12/1935 | Heins | 292/38 |
| 4,243,261 A | * | 1/1981 | Trenkler | 296/213 |
| 4,298,226 A | * | 11/1981 | Mizuma | 296/216.04 |
| 4,702,517 A | | 10/1987 | Maeda et al. | |
| 6,247,319 B1 | | 6/2001 | Kawahara | |
| 7,010,841 B2 | | 3/2006 | Donovan et al. | |
| 7,677,653 B2 | | 3/2010 | Brown et al. | |
| 2008/0310668 A1 | | 12/2008 | Koch et al. | |

\* cited by examiner

*Primary Examiner* — Dennis Pedder
(74) *Attorney, Agent, or Firm* — Global IP Counselors, LLP

(57) ABSTRACT

A vehicle roof assembly includes a vehicle roof structure, an accessory frame and a moveable member. The vehicle roof structure includes a first roof section with a mounting slot and a second roof section with a mounting structure. The accessory frame includes a first frame end that includes a mounting flange, and a second frame end that includes a complementary mounting structure. The mounting flange engages the mounting slot to couple the accessory frame to the vehicle roof structure and to enable the accessory frame to pivot relative to the vehicle roof structure between a pre-installation position and an installed position where the complementary mounting structure engages the mounting structure. The movable member is coupled to the accessory frame and moves between a first position proximate to one of the first and second frame ends, and a second position proximate to the other of the first and second frame ends.

21 Claims, 20 Drawing Sheets

VEHICLE ROOF ASSEMBLY

BACKGROUND

1. Field of the Invention

The present invention generally relates to a vehicle roof assembly. More particularly, the present invention relates to a vehicle roof assembly including a roof structure and an accessory member that includes mounting structures which facilitate installation of the accessory member to the roof structure.

2. Background Information

Many components that are installed in a vehicle during manufacturing of the vehicle are too heavy for a single worker to lift without additional help from, for example, other workers or robotic lift-assist machines. Also, multiple vehicle components often arrive at manufacturing plants pre-assembled by suppliers as a single installation module. Such pre-assembled installation modules may inherently be large or bulky, thus making their installation by a single worker at times difficult and burdensome.

Naturally, hiring additional workers to install a single type of module in vehicles is costly and increases workplace liability. Also, fitting a significant number of plant assembly stations with lift-assist machines is generally impractical, since such machines are typically expensive and occupy valuable plant floor space. Although smaller or segmented installation modules can be used during vehicle manufacture, this would greatly reduce or even eliminate the cost and efficiency benefits realized by using larger, pre-assembled units.

SUMMARY

In view of the state of the known technology, one aspect of the present invention is directed to a vehicle roof assembly including a vehicle roof structure, an accessory frame and a moveable member. The vehicle roof structure includes a first roof section with one of a mounting slot and a mounting flange and a second roof section with a mounting structure. The accessory frame includes a first frame end and a second frame end that is opposite the first frame end. The first frame end includes the other of the mounting slot and the mounting flange, and the second frame end includes a complementary mounting structure. The mounting flange engages the mounting slot to couple the accessory frame to the vehicle roof structure and to enable the accessory frame to pivot relative to the vehicle roof structure between a pre-installation position and an installed position where the complementary mounting structure engages the mounting structure of the second roof section. The movable member is coupled to the accessory frame and moves between a first position proximate to one of the first frame end and the second frame end, and a second position proximate to the other of the first frame end and the second frame end.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
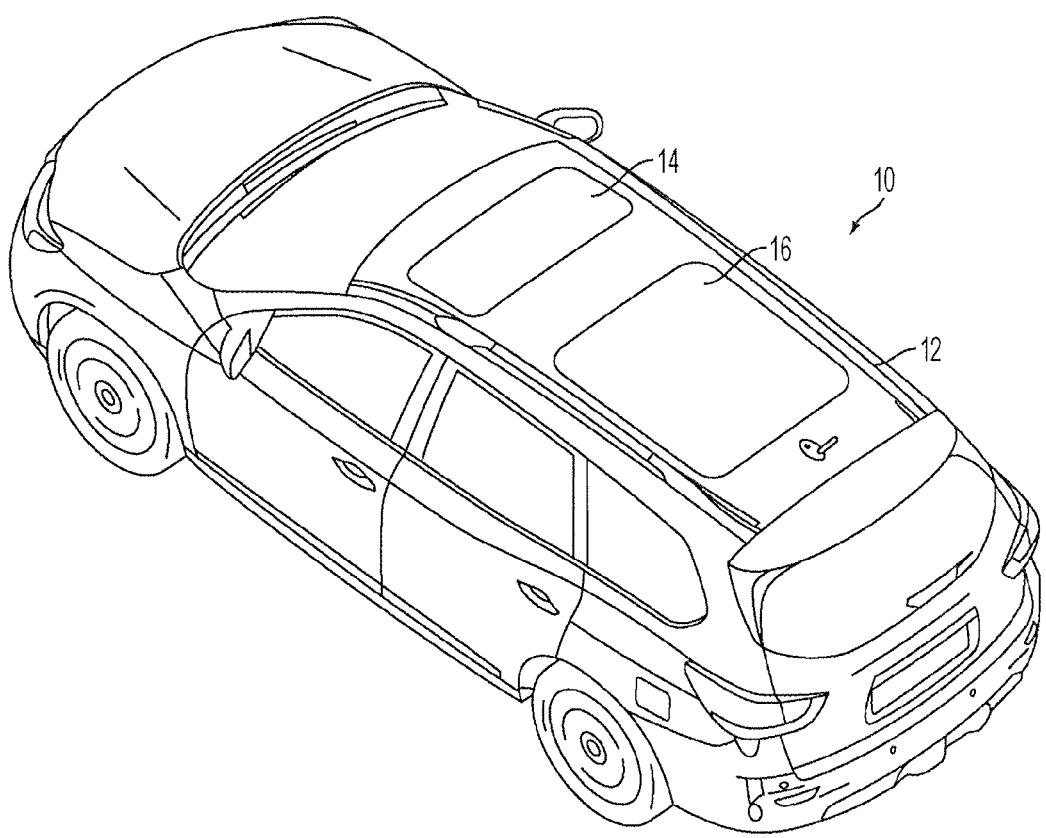
FIG. 1 is a perspective view of a vehicle including a vehicle roof assembly according to embodiments described herein.
Figure 2:
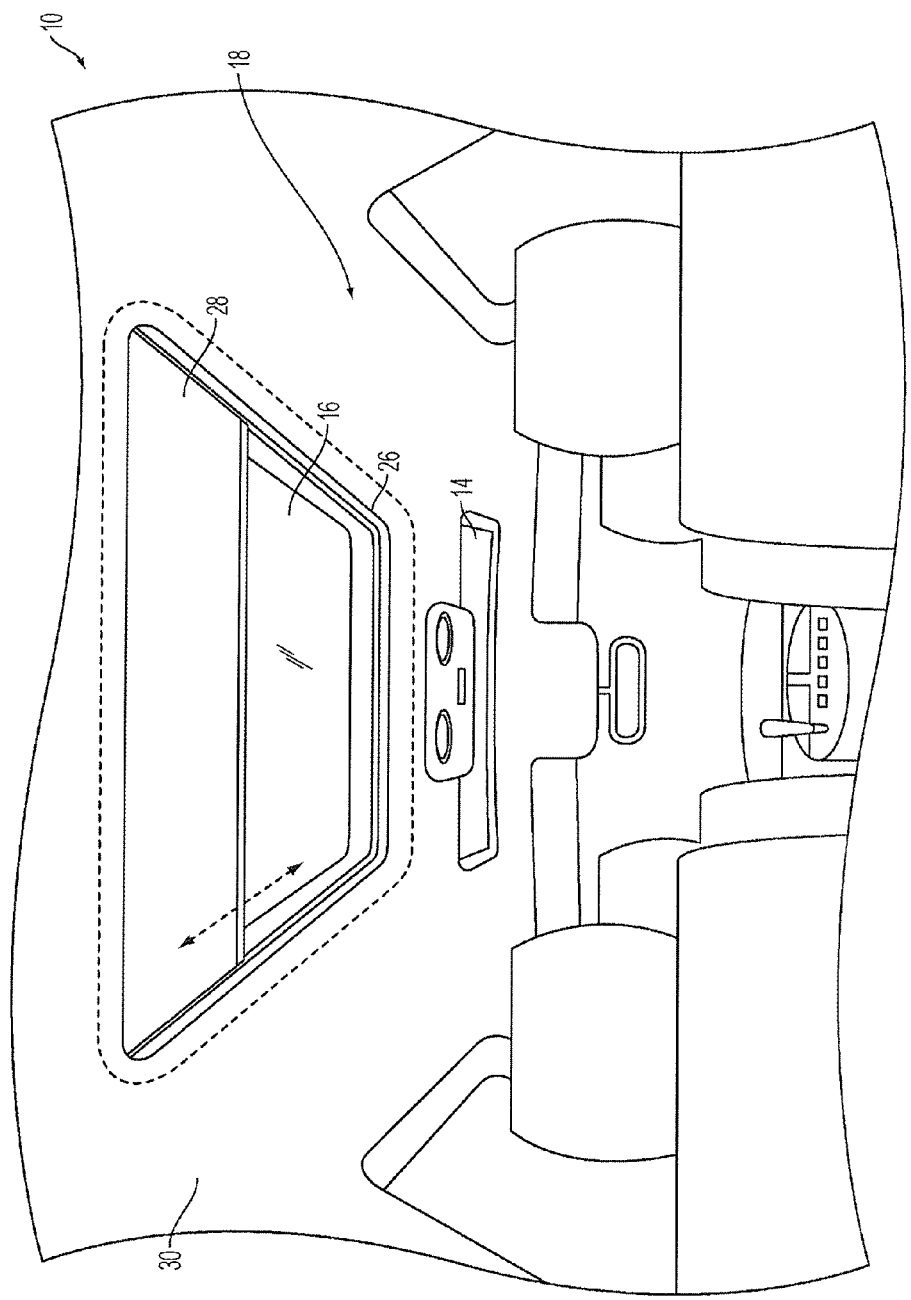
FIG. 2 is a perspective view of the interior of the vehicle shown in FIG. 1.
Figure 3:
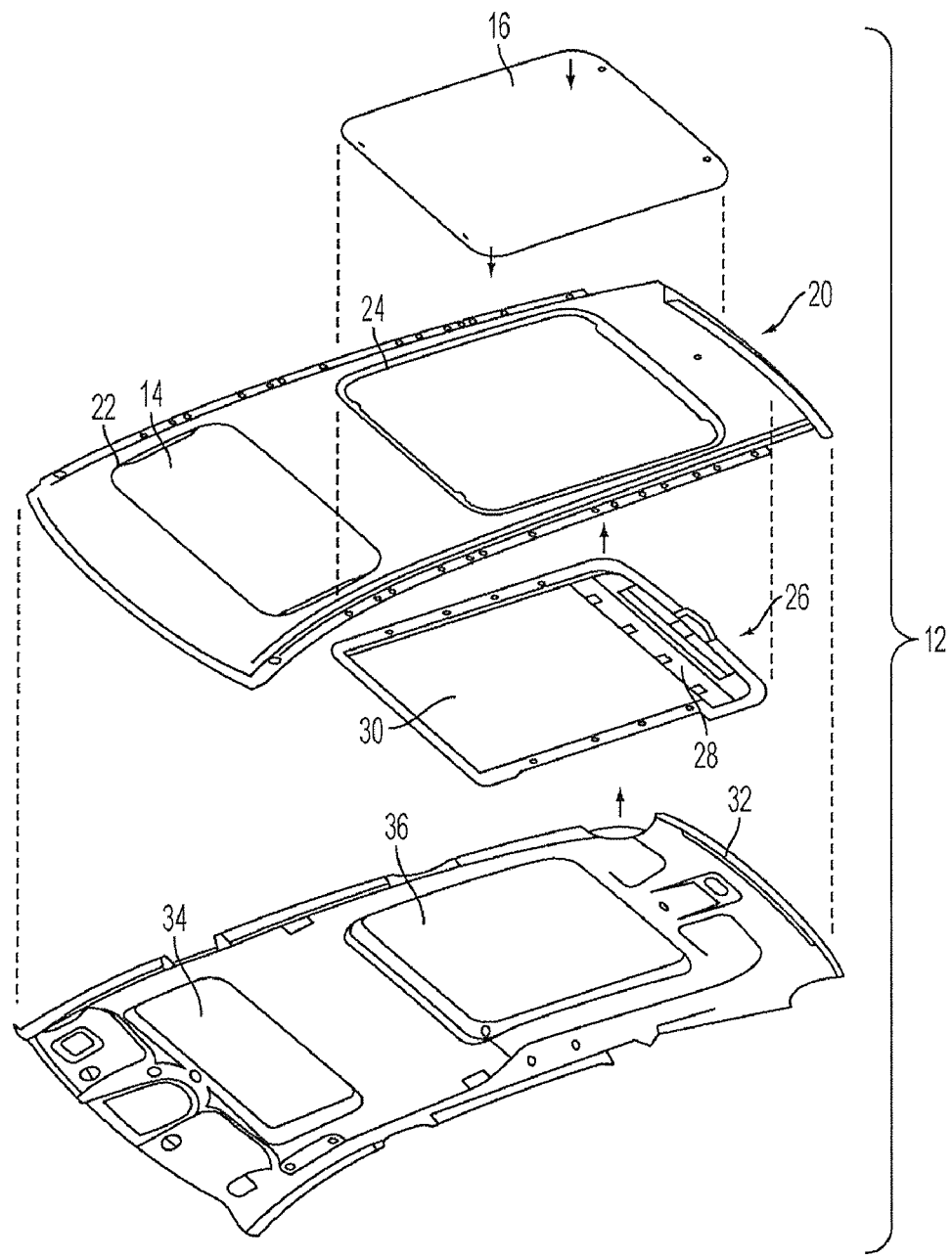
FIG. 3 is an exploded perspective view of the vehicle roof assembly.

Referring initially to FIGS. 1-3, a vehicle 10, such as an automobile, van, truck and so on, includes one or more roof window panels disposed in the vehicle roof assembly 12. In this example, the vehicle roof assembly 12 includes a roof window panel 14 and a roof window panel 16. As shown in FIG. 2, the roof window panel 14 allows external light, such as sunlight, to enter the front seat area of the passenger compartment 18, and the roof window panel 16 allows the external light to enter the rear seat area of the passenger compartment 18.

As shown in more detail in FIG. 3, the vehicle roof assembly 12 includes a vehicle roof structure 20 that can be made of metal, such as steel or aluminum, or any other suitable material used in vehicle manufacturing processes. The vehicle roof structure 20 has openings 22 and 24 into which are installed roof window panels 14 and 16, respectively, in any conventional manner. The vehicle roof assembly 12 further includes an accessory frame 26 that is coupled to the vehicle roof structure 20 at a position proximate to the opening 24. The accessory frame 26 can be made of metal, such as steel or aluminum, or any other suitable material used in vehicle manufacturing processes. In this example, the accessory frame 26 includes a shade assembly with a retractable member 28, such as a shade, that is mounted on a roller 29. Accordingly, if the moveable member 28 is a shade, the accessory frame 26 is a shade frame. The moveable member 28 (e.g., shade) is moveable to cover and expose an opening 30 in the accessory frame 26 that is aligned with or substantially aligned with opening 24.

Furthermore, a trim panel 32 is secured to the vehicle roof structure 20 as indicated by any suitable type of fasteners. The trim panel 30 thus forms an interior overhead surface within the passenger compartment 18 of the vehicle 10. As further shown, the trim panel 32 includes openings 34 and 36 which align with or substantially align with openings 22 and 24 in the vehicle roof structure 20, and thus permit exterior light to enter the passenger compartment 18.

Figure 4:
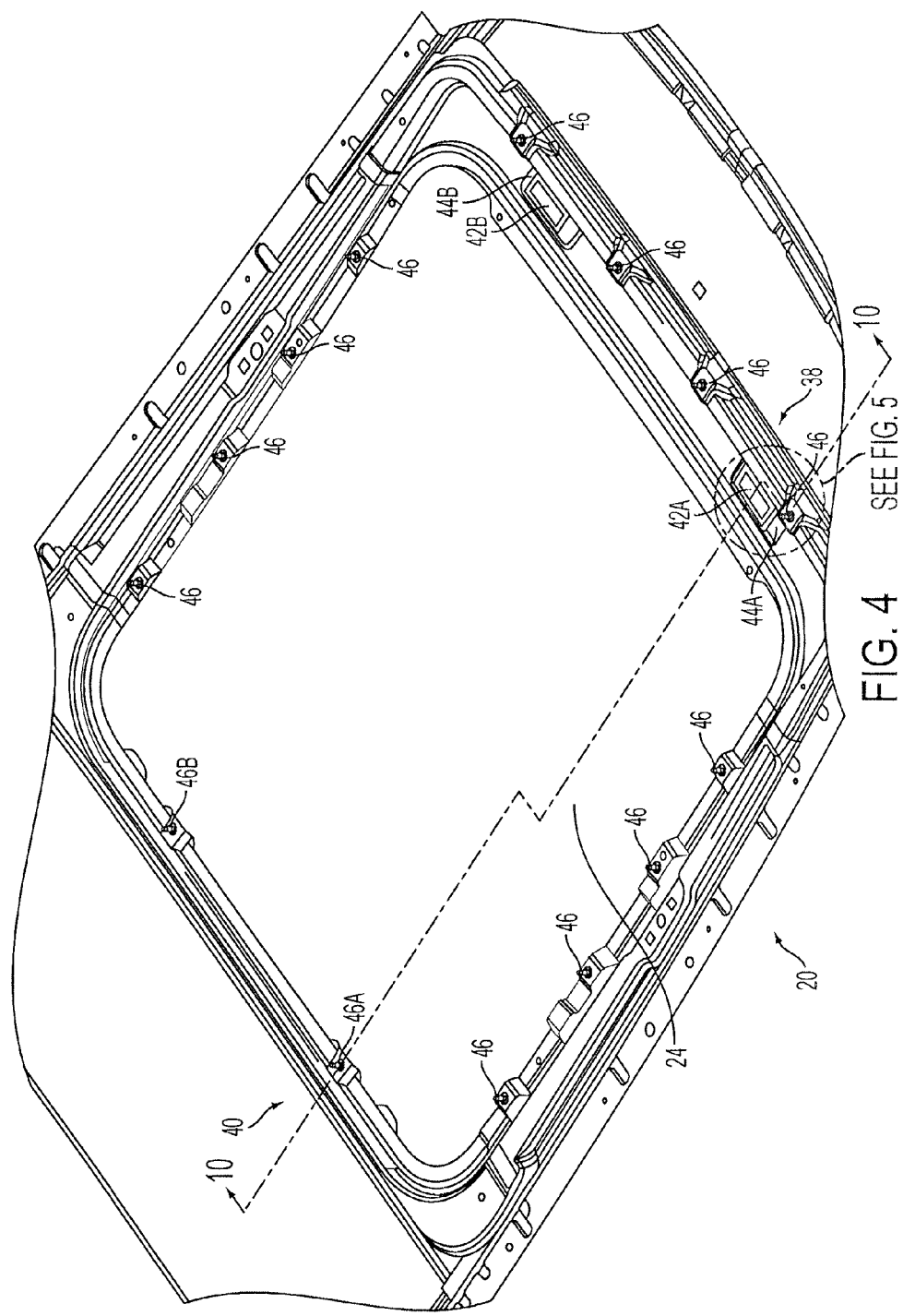
FIG. 4 is a perspective view of the vehicle roof structure of the vehicle roof assembly shown in FIG. 3, as viewed looking upward toward the vehicle roof from inside the vehicle.
Figure 5:
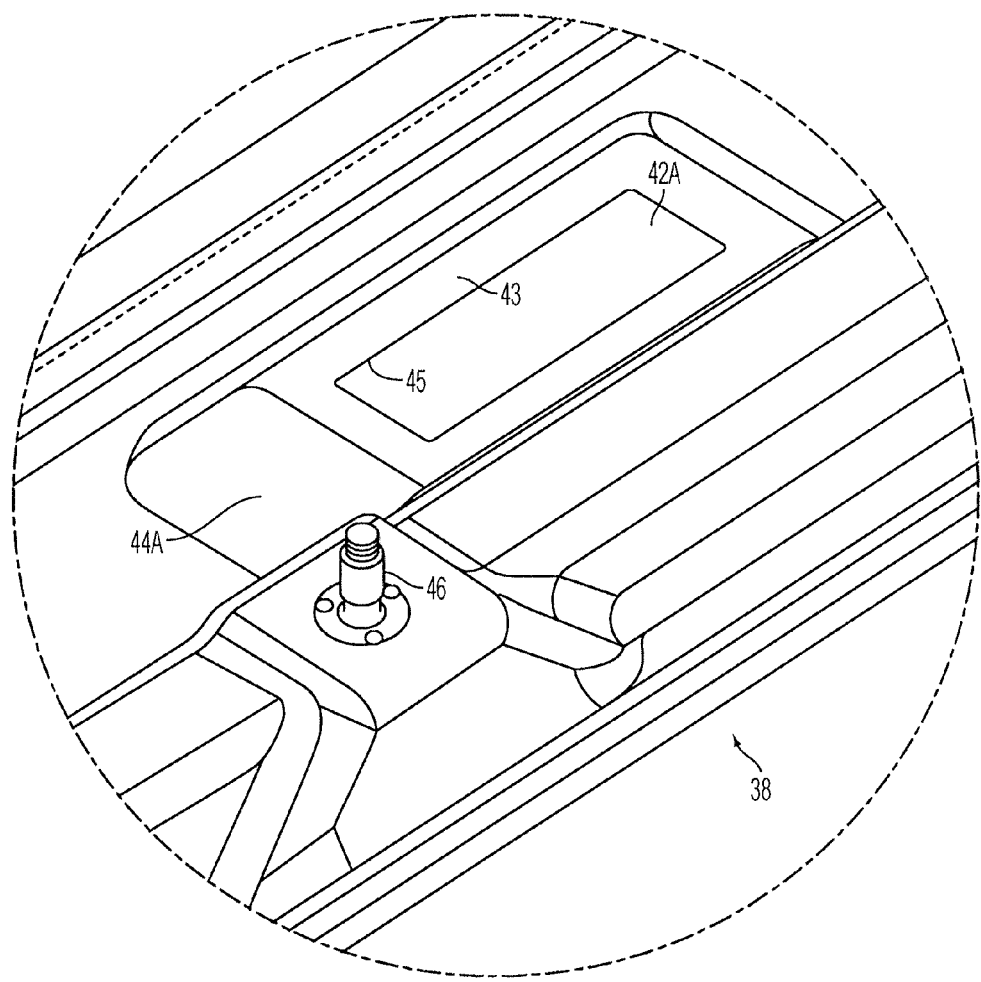
FIG. 5 is a detailed perspective view of a portion of the vehicle roof structure including a mounting slot.
Figure 6:
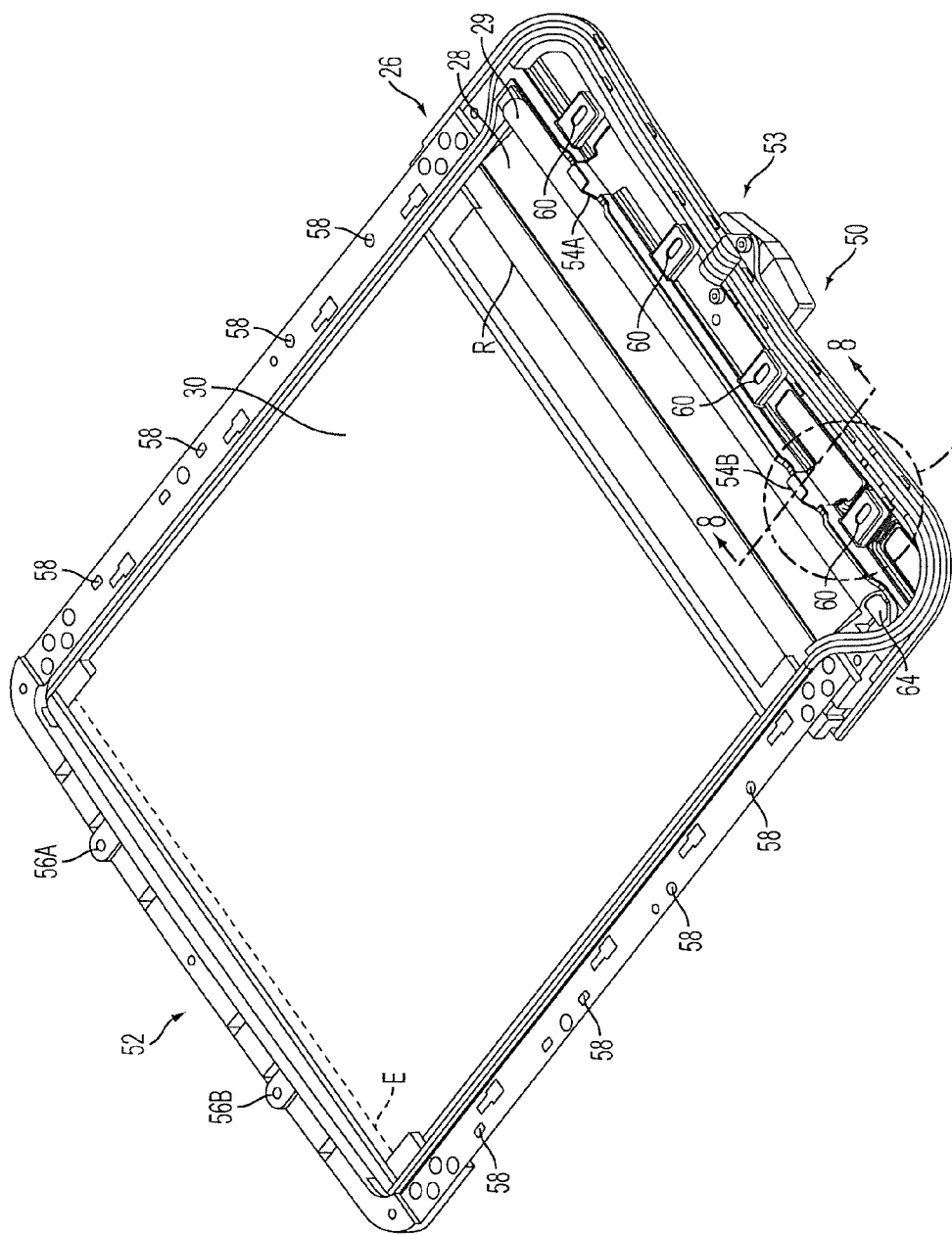
FIG. 6 is a perspective view of an accessory member of the vehicle roof assembly shown in FIG. 3.
Figure 7:
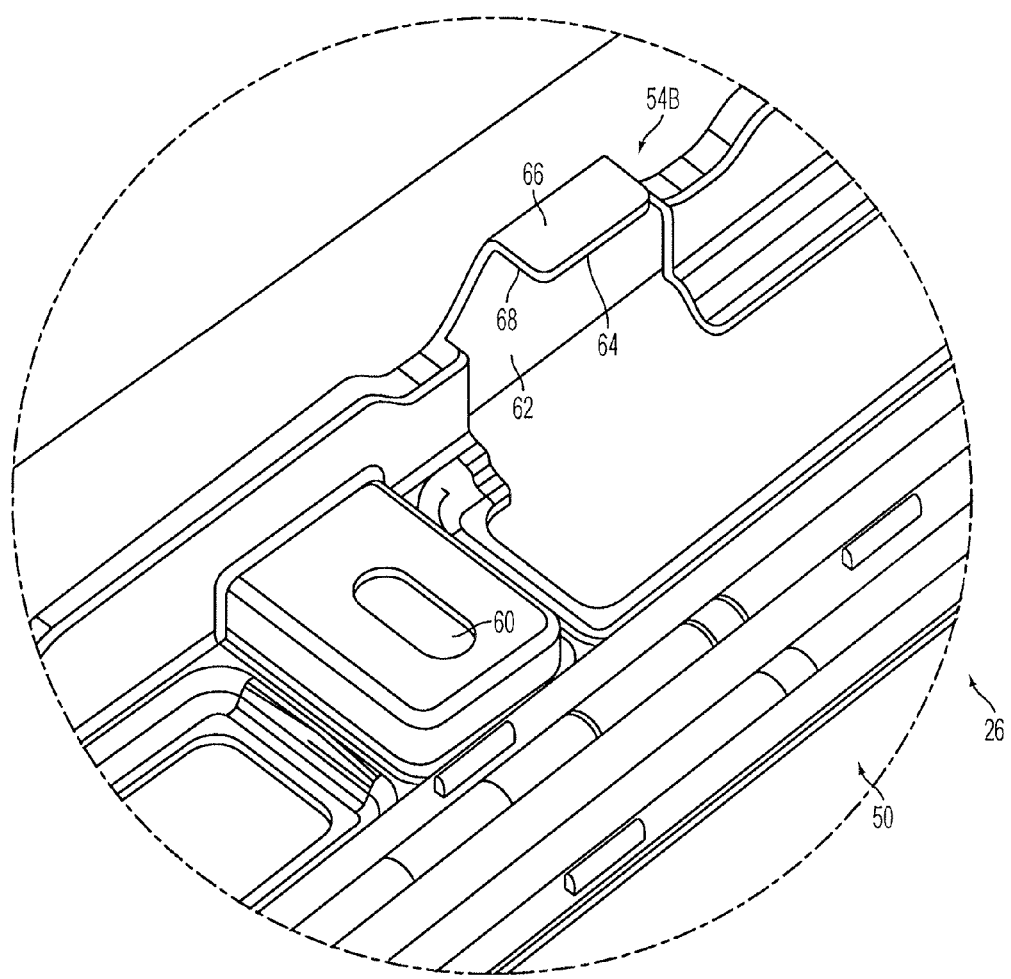
FIG. 7 is a detailed perspective view of a portion of the accessory member including a mounting flange.

As shown in more detail in FIGS. 4 and 5, the vehicle roof structure 20 includes a first roof section 38 and a second roof section 40. The first roof section 38 includes a plurality of mounting slots 42. In this example, the first roof section 38 includes two mounting slots 42 identified as mounting slots 42A and 42B. The mounting slots 42A and 42B are defined by raised portions 44A and 44B, respectively, of the vehicle roof structure 20. Each of the raised portions 44A and 44B has an inner surface 43 facing toward the passenger compartment 18 of the vehicle 10 and an outer surface 45 facing away from the passenger compartment 18 of the vehicle 10 as discussed in more detail below.

The vehicle roof structure includes a plurality of mounting structures 46. In this example, the second roof section 40 includes two mounting structures 46 identified as mounting structures 46A and 46B. The mounting structures 46 include posts or bolts that are secured to the vehicle roof structure 20 by press fitting, welding or in any other suitable manner. Also, the mounting structures, for example 46A and 46B, can be formed integrally with the vehicle roof structure 20. As further shown in FIG. 4, the vehicle roof structure 20 includes mounting structures 46 in addition to mounting structures 46A and 46B that are disposed about the perimeter of the vehicle roof structure 20. The perimeter of the vehicle roof structure 20 defines the opening 24 in the vehicle roof structure 20.

As shown in more detail in FIGS. 6-9, the accessory frame 26 includes a first frame end 50 and a second frame end 52 that is opposite the first frame end 50. The retractable member 28 (e.g., a shade) is thus coupled to the accessory frame 26 and moves between a first retracted position R proximate to, for example, the first frame end 50 and a second extended position E (indicated by phantom lines in FIG. 6) proximate to the second frame end 52. Thus, the moveable member 28 (shade) covers at least a portion of the opening 24 in the vehicle roof structure 20 when in an extended position where the shade extends from at or about the first frame end 50 to at our about the second frame end 52. In this example, a driving mechanism 53, such as a motor, is disposed at the first frame end 50 and facilitates movement of the shade between the retracted position and the extended position.

The first frame end 50 further includes a plurality of mounting flanges 54. In this example, the first frame end 50 includes two mounting flanges 54 identified as mounting flanges 54A and 54B. The second frame end 52 includes a plurality of complementary mounting structures 56. In this example, the second frame end includes two complementary mounting structures identified as complementary mounting structures 56A and 56B. In this example, complementary mounting structures 56A and 56B are openings formed in the second frame end 52. As further shown, the accessory frame 26 includes a plurality of additional complementary mounting structures 58 disposed about the perimeter of opening 30, and a plurality of further complementary mounting structures 60 disposed at the first frame end 50. Accordingly, the plurality of additional mounting structures 46 disposed on the vehicle roof structure 20 between the first roof section 38 and the second roof section 40 engage the plurality of additional complementary mounting structures 58 when the accessory frame 26 is in the installed position. In this example, each of the additional complementary mounting structures 58 includes an opening formed in the accessory frame 26, and each of the further complementary mounting structures 60 includes a slotted or elongated opening formed in the accessory frame 26 at the first frame end 50.

Figure 8:
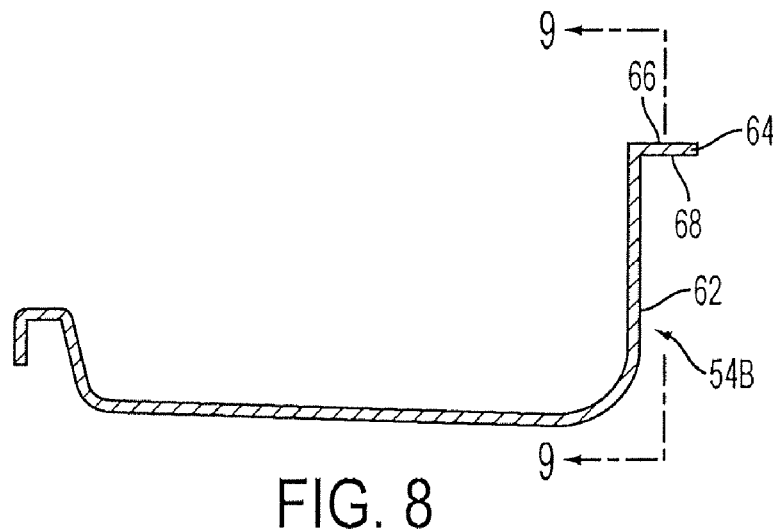
FIG. 8 is a side cross-sectional view of the mounting flange as taken along lines 8-8 in FIG. 6.
Figure 9:
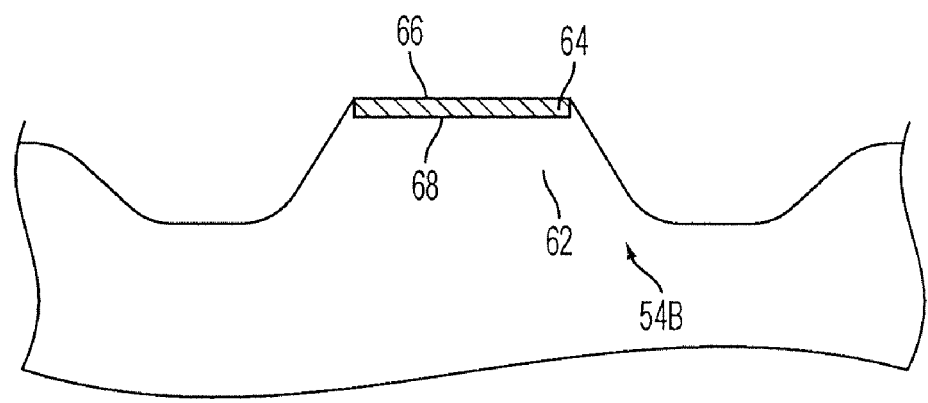
FIG. 9 is a front cross-sectional view of the flange as taken along lines 9-9 in FIG. 8.

FIGS. 8 and 9 illustrate further details of mounting flange 54B. Mounting flange 54A can have the same or substantially the same features as mounting flange 54B. As illustrated, mounting flange 54B includes an upright portion 62 that extends upward in a direction perpendicular or substantially perpendicular to a lateral direction of the vehicle 10 in which the accessory frame 26 extends. However, the upright portion 62 can extend in any direction suitable for the purposes discussed herein. For example, the upright portion 62 can extend from a side surface of the accessory frame 26. The mounting flange 54B further includes a flange portion 64 that extends laterally parallel to a direction spanning the first roof section 38 and the second roof section 40. In other words, the flange portion 64 can extend in a direction perpendicular, substantially perpendicular or transverse to the direction in which the upright portion 62 extends. The flange portion 64 includes an upper surface 66 and a lower surface 68 as indicated.

Figure 10:
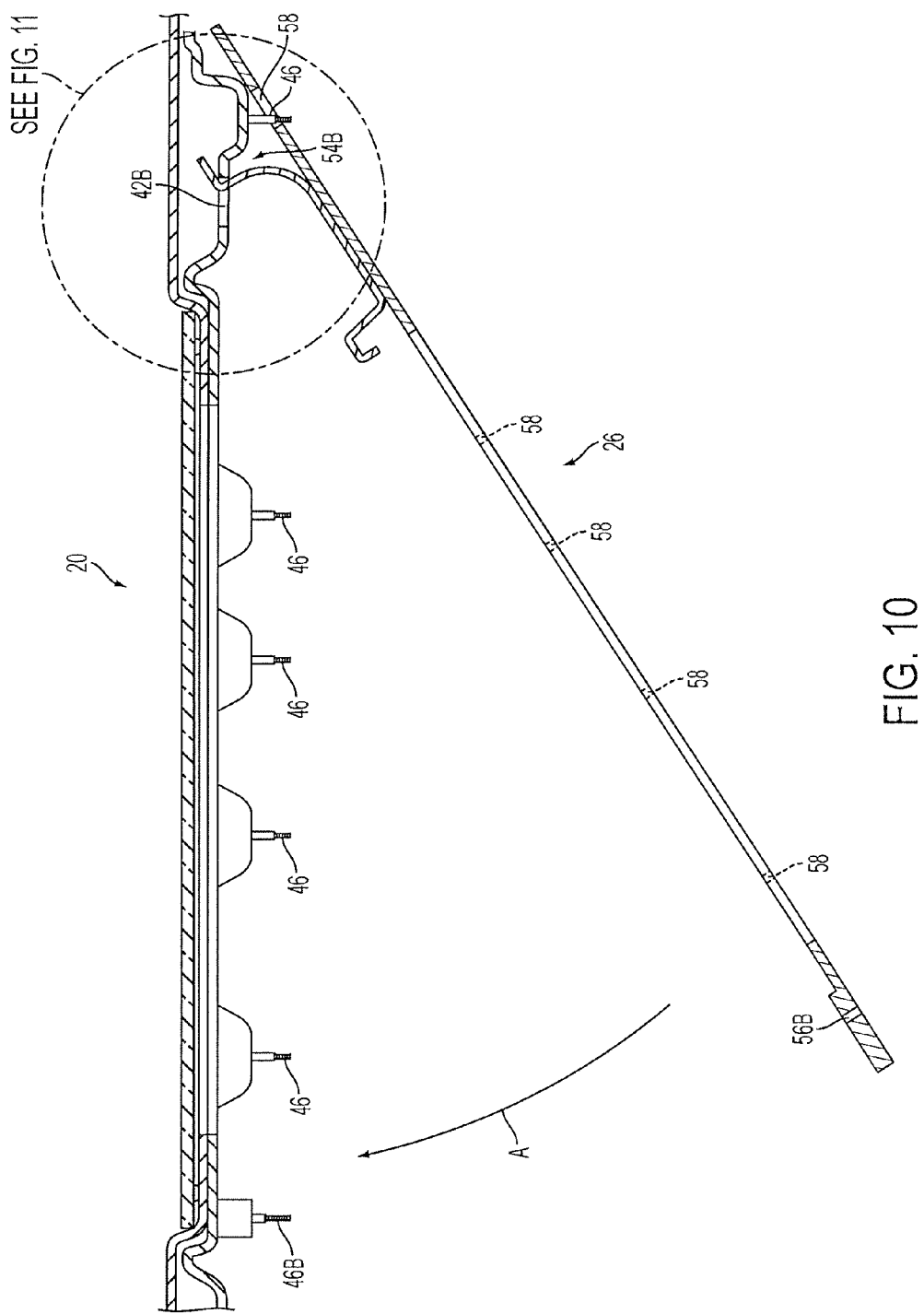
FIG. 10 is a cross-sectional view of the accessory member being mounted to the vehicle roof structure from a pre-installation position as taken along lines 10-10 in FIG. 4.

FIGS. 10-13 illustrate an example of the manner in which the accessory frame 26 is mounted to the vehicle roof structure 20. To begin, the accessory frame 26 is positioned in a pre-installation position as shown in FIG. 10 before the trim panel 32 is installed. That is, an assembly worker can position the accessory frame 26 so that the mounting flanges 54A and 54B are received in the respective mounting slots 42A and 42B of the vehicle roof structure 20. The mounting slots 42A and 42B and the mounting flanges 54A and 54B are defined so that the mounting flanges 54A and 54B extend through the mounting slots 42A and 42B in a direction transverse to a downward-facing surface of the vehicle roof structure 20. Thus, as can be appreciated from FIGS. 4 and 5, for example, the vehicle roof structure 20 includes hollow cavities therein (e.g., defined by the raised portions 44A and 44B) that are accessible through the mounting slots 42A and 42B, and the mounting flanges 54A and 54B extend through the mounting slots 42A and 42B into the cavities of the roof structure 20.

Hence, in the pre-installation position, the mounting flanges 54A and 54B of the accessory frame 26 engage respective mounting slots 42A and 42B of the vehicle roof structure 20. That is, each of the mounting flanges 54A and 54B contacts respective portions of the first roof section 38 that define the mounting slot 54A and 54B while the accessory frame 26 is in the pre-installation position.

As discussed above and shown, for example, in FIGS. 5 and 14-17, the first roof section 38 includes an outer surface 45 facing away from the passenger compartment 18 of the vehicle 10, and the bottom surface 68 of the flange portion 64 contacts the outer surface 45 when the accessory frame 26 is in the pre-installation position as shown in FIG. 10. As is apparent from FIGS. 4 and 5, the outer surface 45 is oppositely located from surface 43 of the raised portions 44A and 44B that define mounting slots 42A and 42B. Accordingly, the mounting flanges 54A and 54B engage the mounting slots 42A and 42B, respectively, to pivotally couple the accessory frame 26 to the vehicle roof structure 20.

Figure 11:
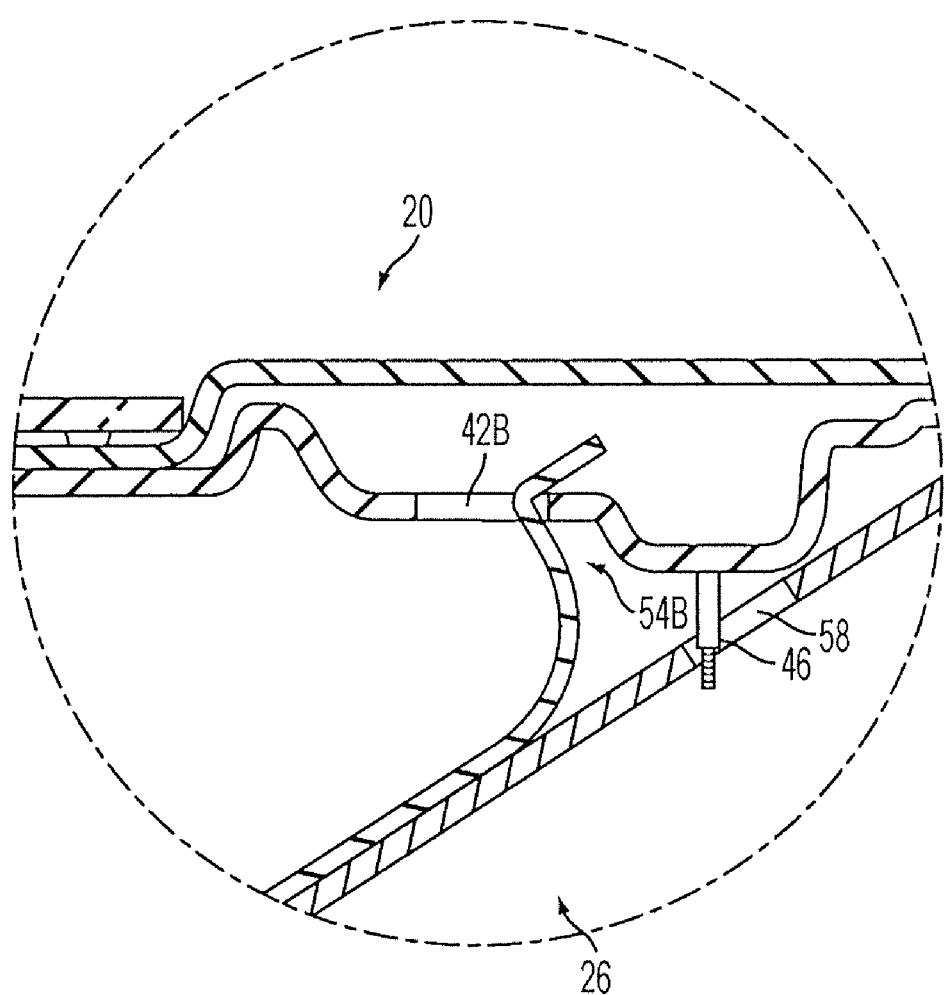
FIG. 11 is a detailed cross-sectional view illustrating the mounting flange of the accessory member engaging a portion of the vehicle roof structure defining the mounting slot as shown in FIG. 10.
Figure 12:
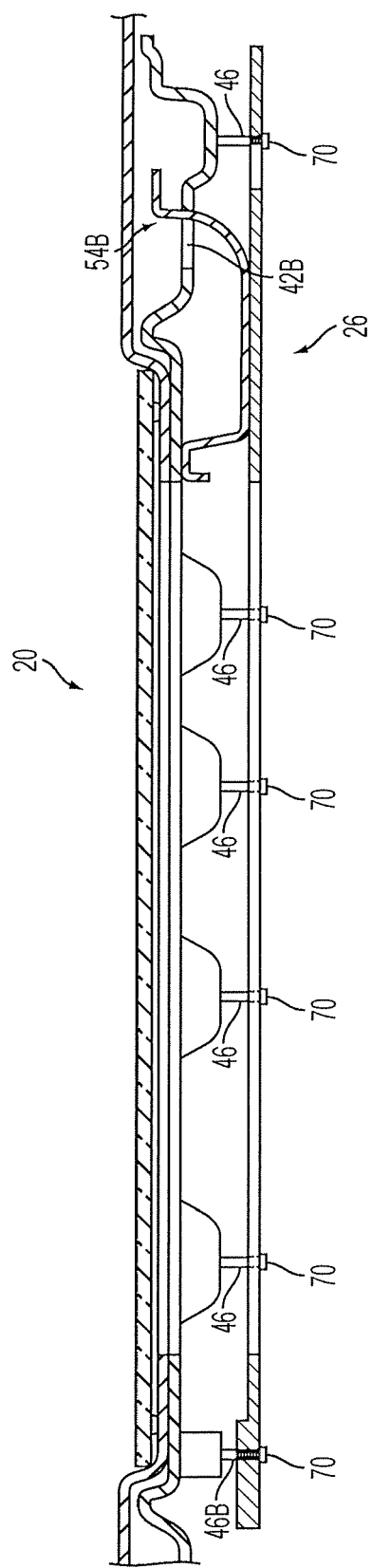
FIG. 12 is a cross-sectional view of the accessory member mounted to the vehicle roof structure in an installed position.
Figure 13:
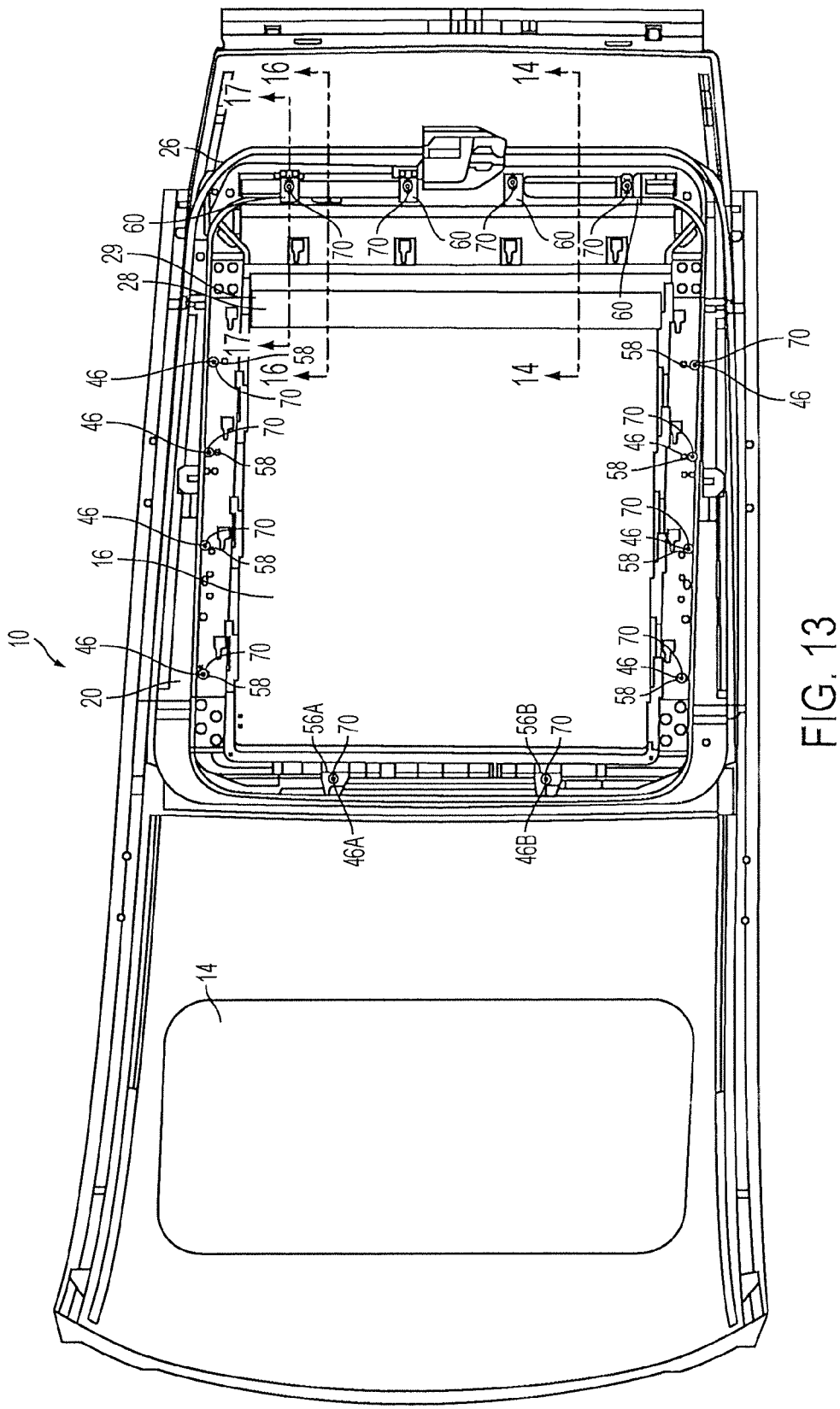
FIG. 13 is a plan view of the accessory member mounted to the vehicle roof structure in an installed position, as viewed looking upward toward the vehicle roof from inside the vehicle.
Figure 14:
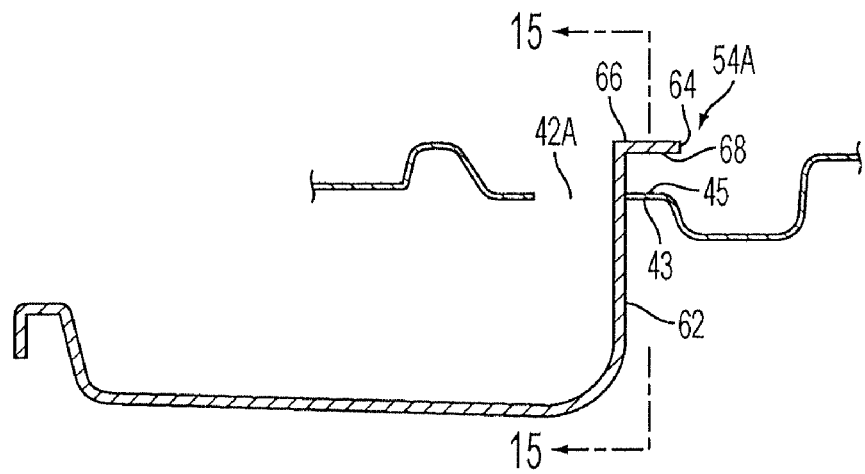
FIG. 14 is a side cross-sectional view as taken along lines 14-14 in FIG. 13.
Figure 15:
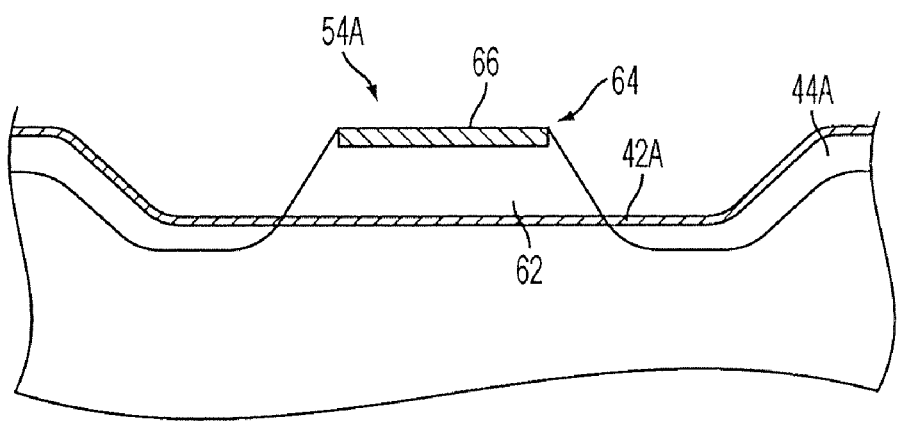
FIG. 15 is a front cross-sectional view as taken along lines 15-15 in FIG. 14.
Figure 16:
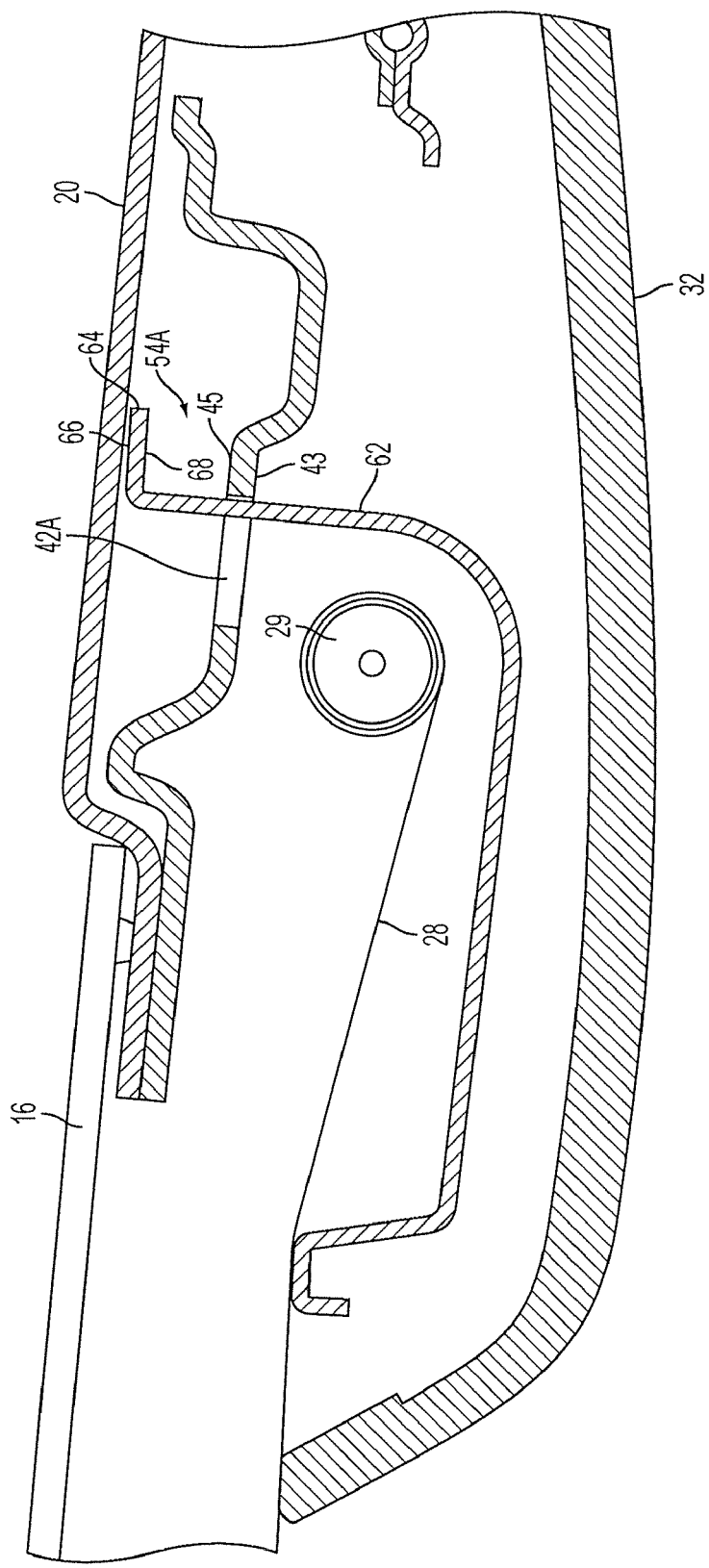
FIG. 16 is a cross-sectional view including the addition of an overhead trim panel as taken along lines 16-16 in FIG. 13.
Figure 17:
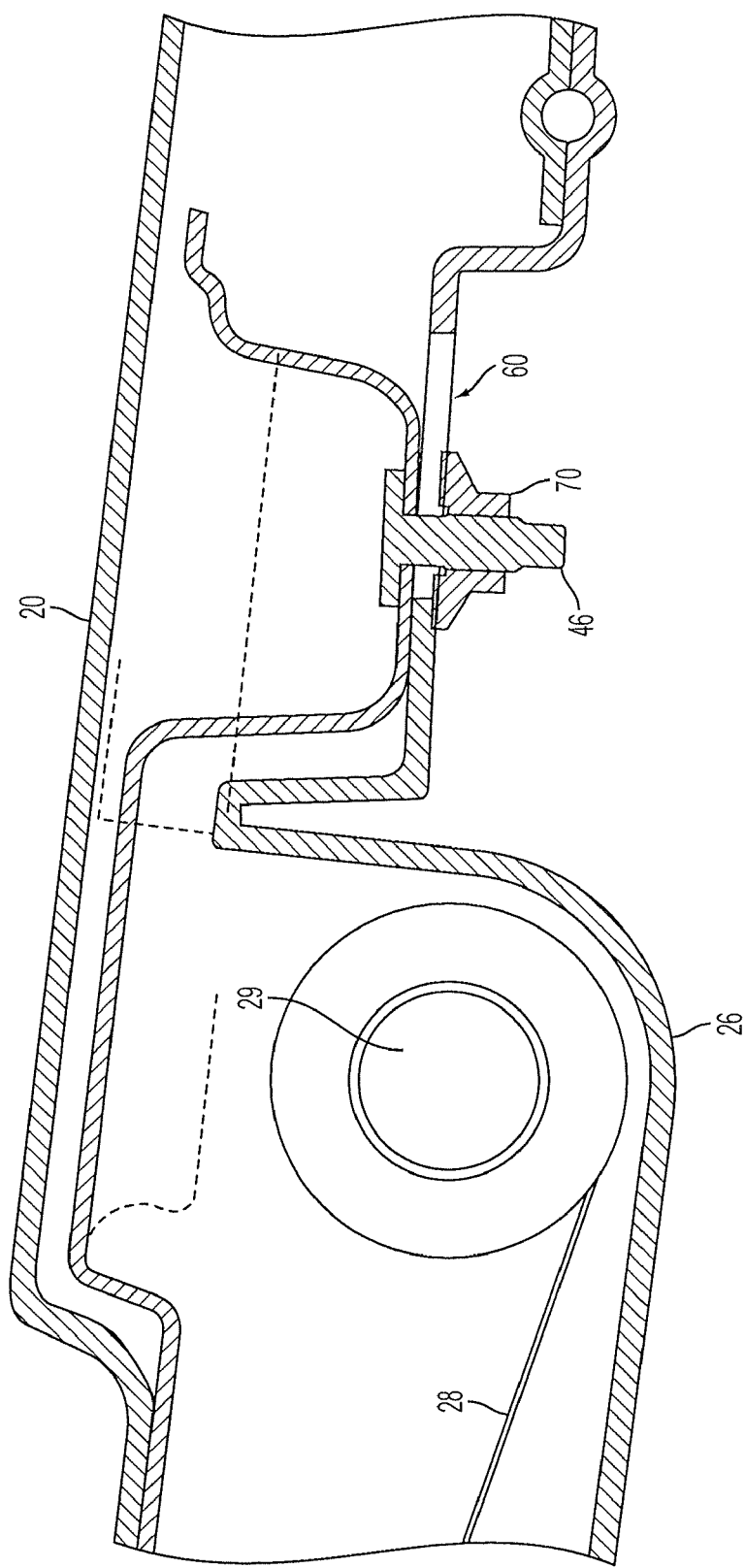
FIG. 17 is a cross-sectional view similar to FIG. 16 as taken along lines 17-17 in FIG. 13.

As shown in FIG. 11, the accessory frame 26 is capable of pivoting relative to the vehicle roof structure 20 about the surface contact between the mounting flanges 54A and 54B and a portion of the vehicle roof structure 20 that defines the mounting slots 42A and 42B from the pre-installation position shown in FIG. 10 to an installed position shown in FIGS. 12 and 13. That is, the assembly worker can apply lifting force to the second frame end 52 of the accessory frame 26 to pivot the accessory frame 26 in the direction indicated by arrow A in FIG. 10. Accordingly, the second frame end 52 will come in contact with the second roof section 40 as shown in FIGS. 12 and 13. Thus, the accessory frame 26 spans roof window panel 16 in the installed position.

As the second frame end 52 moves toward the second roof section 40, the complementary mounting structures 56A and 56B on the accessory frame 26 engage the mounting structures 46A and 46B, respectively, on the second roof section 40 of the vehicle roof structure 20. That is, in this example, the mounting structures 46A and 46B pass through the openings defined by the complementary mounting structures 56A and 56B, respectively. Furthermore, each of the additional mounting structures 46 disposed about the perimeter of the vehicle roof structure 20 engage respective ones of the additional complementary mounting structures 58 disposed about the perimeter of opening 30 in the accessory frame 26 or one of the further complementary mounting structures 60 disposed at the first frame end 50 of the vehicle roof structure 20. Accordingly, since the pivotal engagement of the mounting slots 42A and 42B and mounting flanges 54A and 54B supports the first frame end 50 of the accessory frame 26, the assembly worker can move the accessory frame 26 into the installed position on the vehicle roof structure 20 by lifting the second frame end 52. This allows a single assembly worker to install fasteners at the second frame end 52, before finally installing fasteners at the first frame end 50.

That is, the mounting structures 46A and 46B of the vehicle roof structure 20 are then secured to the complementary mounting structures 56A and 56B of the accessory frame 26. For example, the assembly worker can thread a nut 70 onto each of the mounting structures 46A and 46B to retain the accessory frame 26 to the vehicle roof structure 20. Naturally, any other suitable type of connector can be used to secure the complementary mounting structures 56A and 56B to mounting structures 46A and 46B in order to couple the accessory frame 26 to the vehicle roof structure 20. At that point, the accessory frame 26 is secured to the vehicle roof structure 20 at the second frame end 52 by the mounting structures 46A and 46B and complementary mounting structures 56A and 56B, which are secured to each other by nuts 70. At the same time, the accessory frame 26 is secured to the vehicle roof structure 20 at the first frame end 50 by mounting flanges 54A and 54B, which engage the raised portions 44A and 44B that define the mounting slots 42A and 42B, respectively.

The assembly worker can then thread a nut 70 onto each of the additional mounting structures 46 to secure each of the additional complementary mounting structures 58 and each of the further complementary mounting structures 60 to the additional mounting structures 46, thus further securing the accessory frame 26 to the vehicle roof structure 20. Any other suitable type of connector can be used to secure the additional complementary mounting structures 58 and further complementary mounting structures 60 to mounting structures 46 to further secure the accessory frame 26 to the vehicle roof structure 20. Furthermore, the mounting structures 46, including mounting structures 46A and 46B can instead be disposed on the accessory frame 26, and the complementary mounting structures 56A and 56B, 58 and 60 can instead be disposed on the vehicle roof structure 20.

As further shown in FIGS. 14-17, as the accessory frame 26 is secured to the vehicle roof structure 20, the accessory frame 26 is vertically brought into direct contact with the vehicle roof structure 20. As this occurs, the bottom surface 68 of the flange portion 64 of each of the mounting flanges 54A and 54B is removed from contact with the outer surface 45 of the respective raised portions 44A and 44B that define the mounting slots 42A and 42B of the vehicle roof structure 20 when the accessory frame 26 is in the installed position. Subsequent to securement of the accessory frame 26 to the vehicle roof structure 20, the trim panel 32 can be installed. However, the trim panel 32 can instead be configured such that opening 36 is large enough to accommodate accessory frame 26. Thus, it is possible for the trim panel 32 to be installed before the accessory frame 26 is installed.

Figure 18:
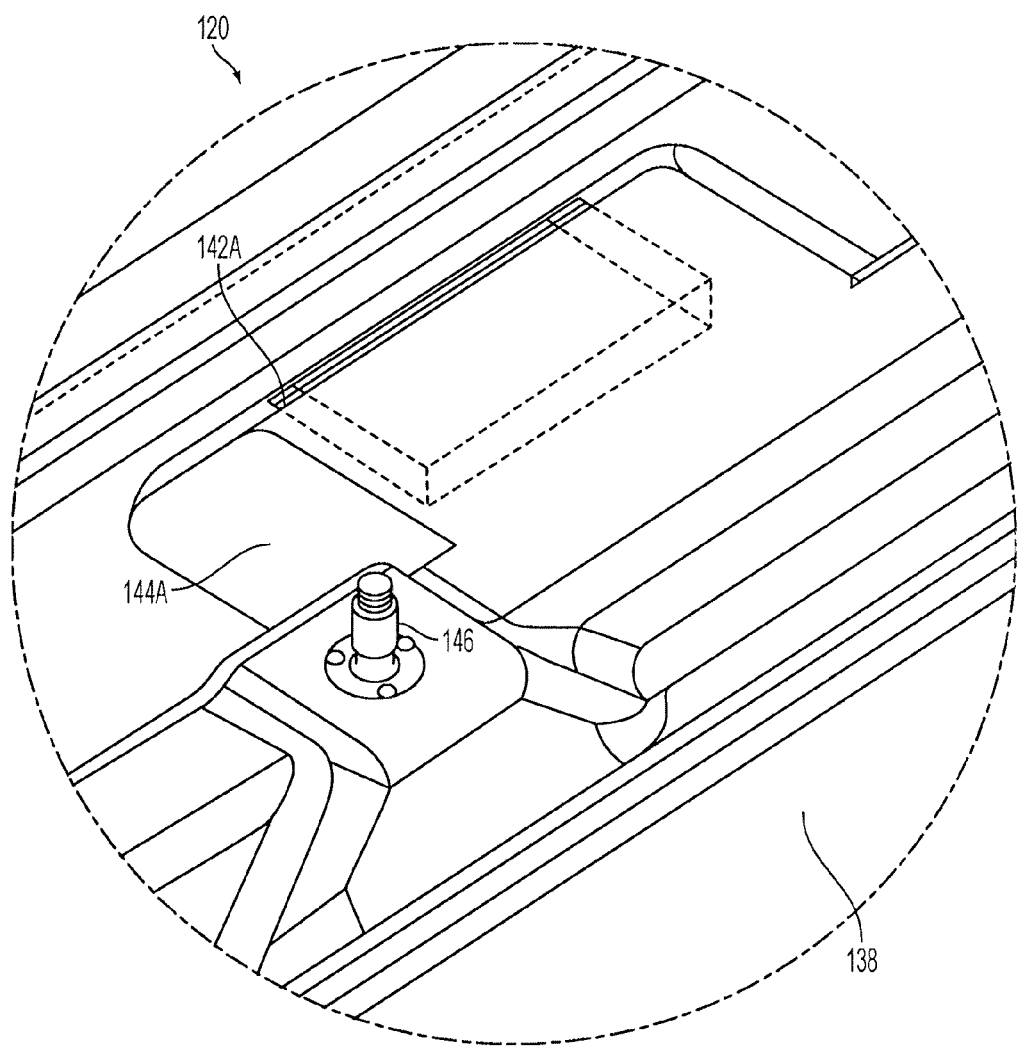
FIG. 18 is a detailed perspective view of a portion of the vehicle roof structure including a mounting slot according to another embodiment.
Figure 19:
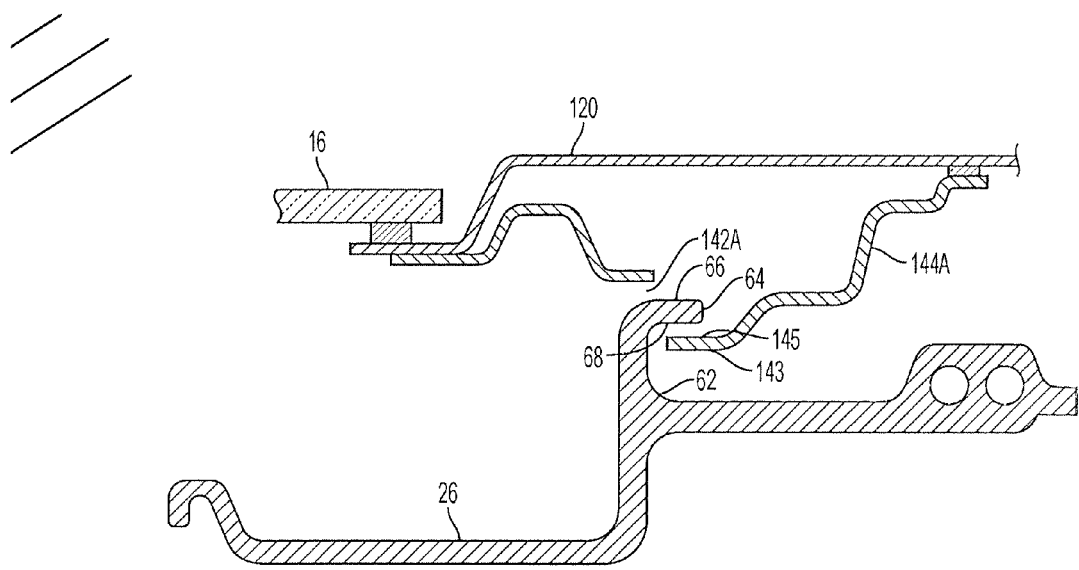
FIG. 19 is a cross-sectional view of the embodiment of the accessory member mounted to the vehicle roof structure shown in FIG. 18 in an installed position.

Another embodiment of the present invention is illustrated in FIGS. 18 and 19. In particular, in this example, raised portions 144 of the vehicle roof structure 20 each define mounting slots 142 formed in the sides of the raised portions 144. FIGS. 18 and 19 illustrate an example of a portion of the first roof section 138. The first roof section 138 has mounting structures 146 which are similar to mounting structures 46 discussed above, and is generally configured similarly to first roof section 38 as discussed above. Aside from the addition of a mounting slot 142A formed on a side surface, the raised portion 144A is otherwise configured similarly to raised portion 44A. Similarly, raised portion 144B (not shown) defines a mounting slot 142B (not shown) on a side surface. Accordingly, the mounting slots 142A (and 142B) of the vehicle roof structure 120 and the mounting flanges 54A and 54B of the accessory frame 26 are configured so that the mounting flanges 54A and 54B extend through the mounting slots 142A and 142B in a fore-to-aft direction of the vehicle 10 as shown in FIG. 19. The arrangements of the mounting flanges 54A and 54B and the mounting slots 142A and 142B function in a manner similar to the arrangement of mounting flanges 54A and 54B and mounting slots 42A and 42B discussed above. That is, the lower surface 68 of the mounting flanges (mounting flange 54A shown in FIGS. 18 and 19) contacts the outer surface 145 of the raised portions (raised portion 144A shown in FIGS. 18 and 19) to couple the accessory frame 26 to the vehicle roof structure 120 and enable the accessory frame 26 to pivot relative to the vehicle roof structure 120. Furthermore, as with vehicle roof structure 20, once the accessory frame 26 is mounted to the vehicle roof structure 120 in the installed position, the lower surfaces 68 of the mounting flanges 54A and 54B are removed from contact with the outer surfaces 145 of the raised portions 144A and 144B as discussed above.

Figure 20:
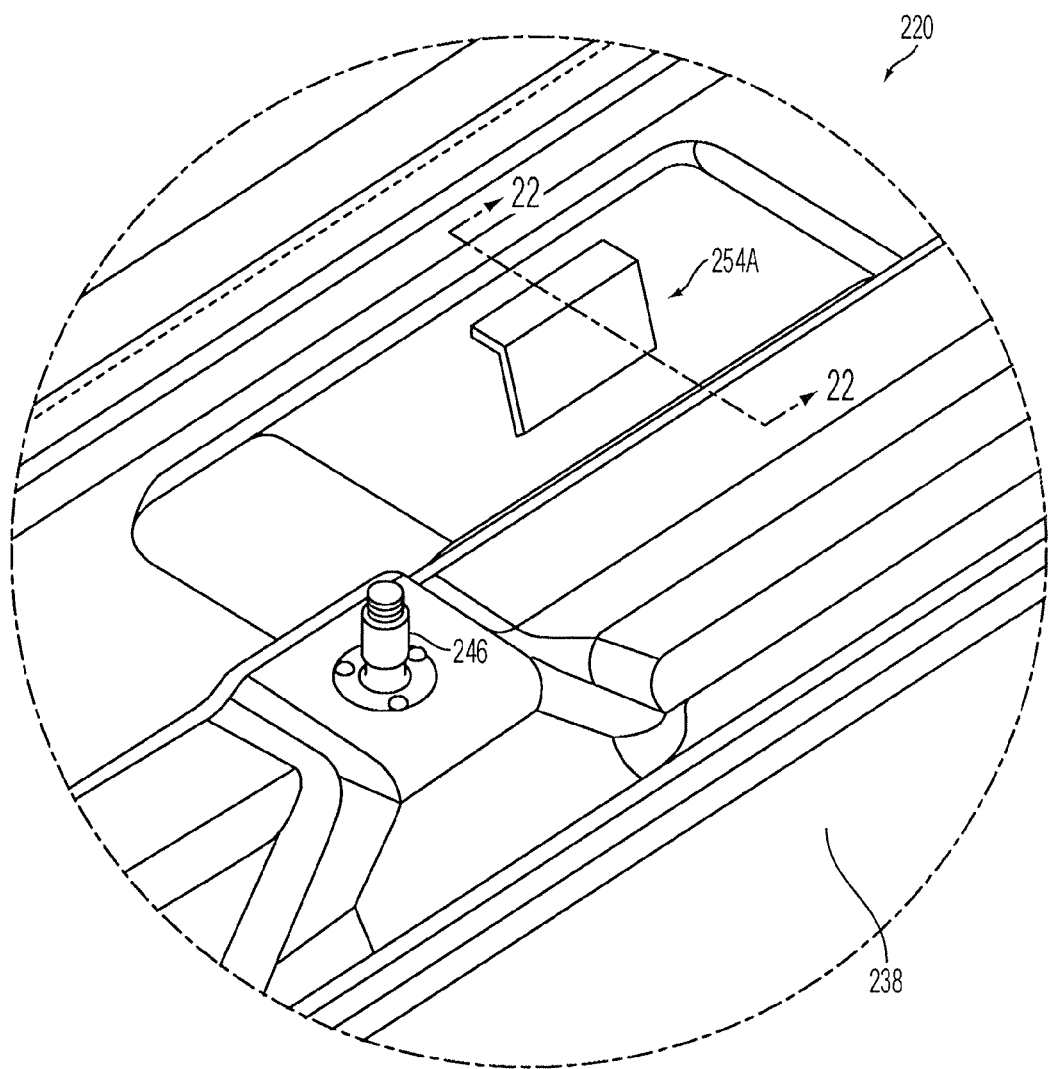
FIG. 20 is a detailed perspective view of a portion of the vehicle roof structure including a mounting flange according to a further embodiment.
Figure 21:
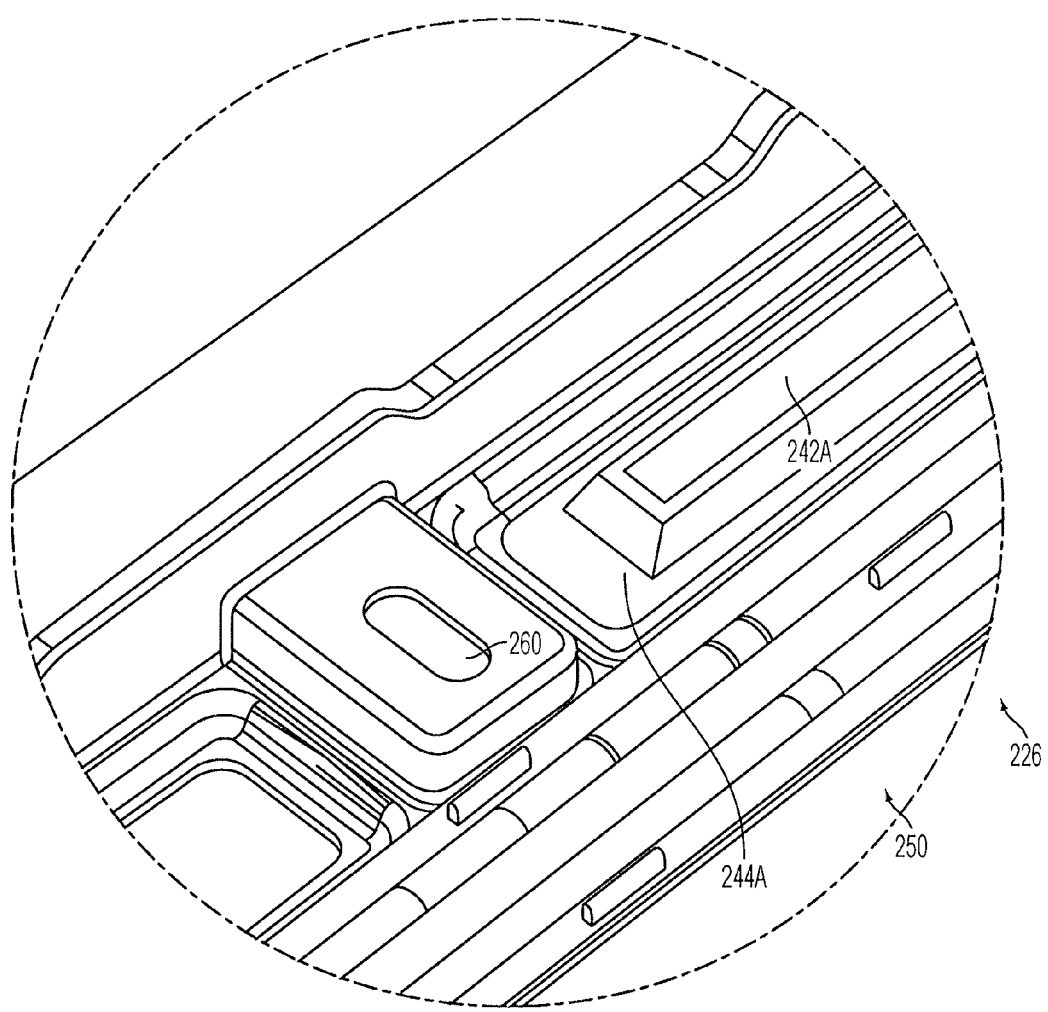
FIG. 21 is a detailed perspective view of a portion of the accessory member including a mounting slot according to a further embodiment.
Figure 22:
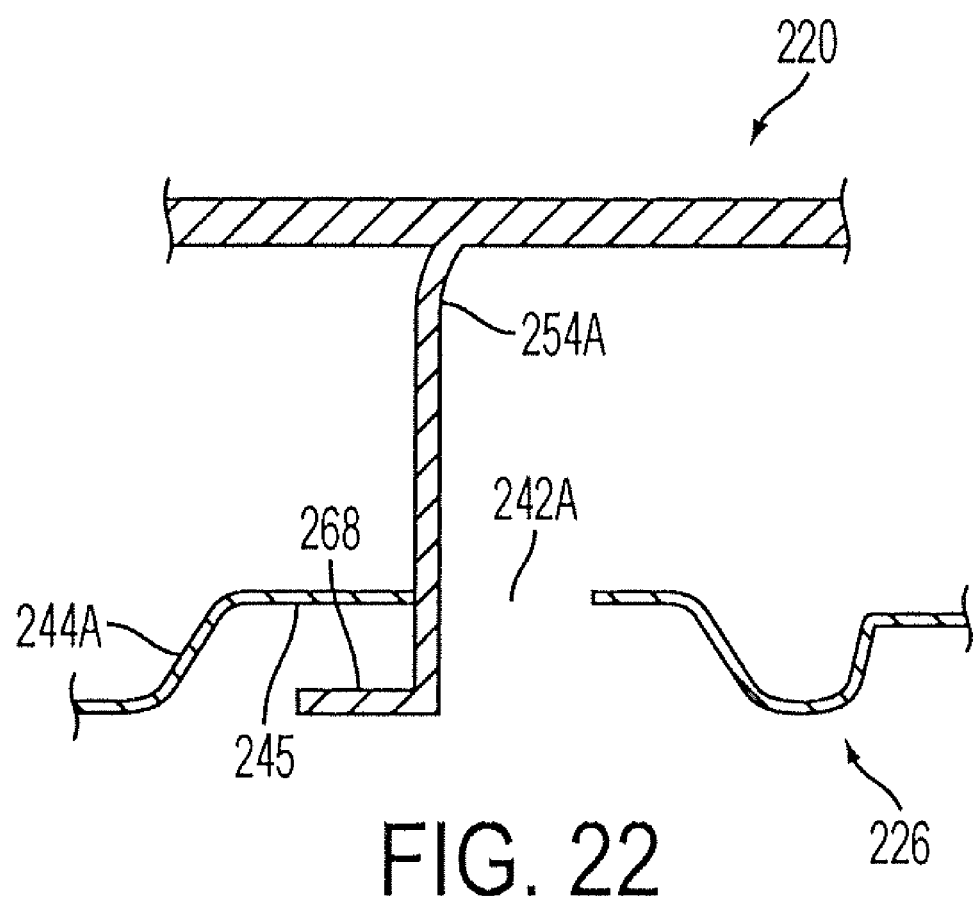
FIG. 22 is a cross-sectional view of the embodiment shown in FIGS. 20 and 21 with the accessory member coupled to the vehicle roof structure in an installed position as taken along lines 22-22 in FIG. 20.

In addition, as shown in FIGS. 20-22, a vehicle roof structure 220 may be configured to include a plurality of flanges 254 and an accessory member 226 may be configured to include a plurality of mounting slots 242. FIG. 20 illustrates an example of a portion of the first roof section 238 according to this embodiment. The first roof section 238 has mounting structures 246 which are similar to mounting structures 46 discussed above, and is generally configured similar to the first roof section 38 as discussed above. However, the first roof section 238 has a plurality of mounting flanges 254 (mounting flange 254A is shown) similar to mounting flanges 54A and 54B.

Also, as shown in FIG. 21, accessory frame 226 is configured in a manner similar to accessory frame 26 discussed above. For example, accessory frame 226 has mounting structures 260 at the first frame end 250. However, portions of the accessory frame 226 adjacent to the mounting structures 260 include raised portions 244 (raised portion 244A is shown) that define mounting slots 242 (mounting slot 242A is shown) similar to mounting slots 42A and 42B discussed above. The arrangements of the mounting flanges 254A and 254B (not shown) and the mounting slots 242A and 242B (not shown) function in a manner similar to the arrangement of mounting flanges 54A and 54B and mounting slots 42A and 42B discussed above. That is, surfaces 268 of the mounting flanges (mounting flange 254A shown in FIGS. 20 and 22) contact inner surfaces 245 of the raised portions 244 (raised portion 244A shown in FIGS. 21 and 22) to couple the accessory frame 226 to the vehicle roof structure 220 in the pre-installation position (see, for example, FIG. 10) and to enable the accessory frame 226 to pivot relative to the vehicle roof structure 220. Furthermore, as with vehicle roof structure 20, once the accessory frame 226 is mounted to the vehicle roof structure 220 in the installed position, the surfaces 268 of the mounting flanges 254A and 254B are removed from contact with the inner surfaces 245 of the raised portions 244A and 244B.

Naturally, as can be appreciated from the above, any of the vehicle roof structures 20, 120 and 220 described herein can include one or more mounting slots and/or one or more mounting flanges. Likewise, any of the accessory frames 26, 126 and 226 can include one or more mounting slots and/or one or more mounting flanges. For example, a vehicle roof structure 20, 120 or 220 can include one mounting slot and one mounting flange. Likewise, the accessory frame 26, 126 or 226 can include one mounting slot and one mounting flange that engage a respective mounting flange and mounting slot on the vehicle roof structure 20, 120 or 200 in a manner as discussed above.

Also, the vehicle roof structure 20, 120 and 220 can include any combination of mounting structures 46, mounting structures 46A and 46B, and any combination of complementary mounting structures 56A, 56B, 58 and 60 as discussed above. Likewise, the accessory frame 26, 126 and 226 can include any combination of mounting structures 46, mounting structures 46A and 46B, and any combination of complementary mounting structures 56A, 56B, 58 and 60 as discussed above, configured to engage with corresponding mounting structures 46, mounting structures 46A and 46B, and/or any combination of complementary mounting structures 56A, 56B, 58 and/or 60 to mount the accessory frame 26, 126 or 226 to vehicle roof structure 20, 120 or 220 in the installed position as discussed above.

Accordingly, the configurations discussed above make it possible for a single worker to install a large overhead accessory frame 26, such as a shade assembly, in the vehicle 10.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle roof assembly. Accordingly, these terms, as utilized to describe the present invention should be interpreted relative to a vehicle equipped with the vehicle roof assembly. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments of the present invention are provided for illustration only, and not for the purpose of limiting the invention as defined by the appended claims and their equivalents.

What is claimed is:

1. A vehicle roof assembly comprising:
a vehicle roof structure including a first roof section with one of a mounting slot and a mounting flange and a second roof section with a mounting structure;
an accessory frame including a first frame end and a second frame end that is opposite the first frame end, the first frame end including the other of the mounting slot and the mounting flange, and the second frame end including a complementary mounting structure, the mounting flange engaging the mounting slot to couple the accessory frame to the vehicle roof structure and to enable the accessory frame to pivot relative to the vehicle roof structure between a pre-installation position and an installed position where the complementary mounting structure engages the mounting structure of the second roof section; and
a movable member coupled to the accessory frame that moves between a first position proximate to one of the first frame end and the second frame end, and a second position proximate to the other of the first frame end and the second frame end;
the mounting flange contacting a portion of one of the first roof section and the first frame end that defines the mounting slot while the accessory frame is in the pre-installation position and being removed from contact with the portion defining the mounting slot while the accessory frame is in the installed position.

2. The vehicle roof assembly according to claim 1, wherein the first frame end includes the mounting flange and the first roof section includes the mounting slot.

3. A vehicle roof assembly comprising:
a vehicle roof structure including a first roof section with a mounting slot and a second roof section with a mounting structure;
an accessory frame including a first frame end and a second frame end that is opposite the first frame end, the first frame end including a mounting flange, and the second frame end including a complementary mounting structure, the mounting flange engaging the mounting slot to couple the accessory frame to the vehicle roof structure and to enable the accessory frame to pivot relative to the vehicle roof structure between a pre-installation position and an installed position where the complementary mounting structure engages the mounting structure of the second roof section, and the mounting flange including a horizontal portion, a bottom surface of the horizontal portion contacting a portion of the first roof section that defines the mounting slot while the accessory frame is in the pre-installation position and is removed from contact with the portion of the first roof section while the accessory frame is in the installed position; and
a movable member coupled to the accessory frame that moves between a first position proximate to one of the first frame end and the second frame end, and a second position proximate to the other of the first frame end and the second frame end.

4. The vehicle roof assembly according to claim 3, wherein the first roof section includes an outer surface facing an exterior of a vehicle that includes the vehicle roof assembly, and the mounting flange contacts the outer surface when the accessory frame is in the pre-installation position.

5. The vehicle roof assembly according to claim 1, wherein the first frame end includes the mounting slot and the first roof section includes the mounting flange.

6. A vehicle roof assembly comprising:
a vehicle roof structure including a first roof section with a mounting flange and a second roof section with a mounting structure;
an accessory frame including a first frame end and a second frame end that is opposite the first frame end, the first frame end including a mounting slot, and the second frame end including a complementary mounting structure, the mounting flange engaging the mounting slot to couple the accessory frame to the vehicle roof structure and to enable the accessory frame to pivot relative to the vehicle roof structure between a pre-installation position and an installed position where the complementary mounting structure engages the mounting structure of the second roof section, and the mounting flange including a horizontal portion, a top surface of the horizontal portion contacting a portion of the first frame end that defines the mounting slot while the accessory frame is in the pre-installation position and is removed from contact with the portion of the first frame end while the accessory frame is in the installed position; and
a movable member coupled to the accessory frame that moves between a first position proximate to one of the first frame end and the second frame end, and a second position proximate to the other of the first frame end and the second frame end.

7. The vehicle roof assembly according to claim 3, wherein the mounting flange includes a lateral extension that extends parallel to a direction spanning the first roof section and the second roof section.

8. The vehicle roof assembly according to claim 3, wherein the accessory frame is a shade frame, and the movable member is a shade.

9. The vehicle roof assembly according to claim 8, wherein the vehicle roof structure defines an opening therein, and the shade covers at least a portion of the opening when in an extended position.

10. The vehicle roof assembly according to claim 3, wherein
the accessory frame spans a roof window panel in the installed position.

11. The vehicle roof assembly according to claim 3, wherein
the vehicle roof structure includes a plurality of additional mounting structures disposed between the first roof section and the second roof section; and
the accessory frame includes a plurality of additional complementary mounting structures that engage with the additional mounting structures when the accessory frame is in the installed position.

12. The vehicle roof assembly according to claim 11, wherein
the additional mounting structures include one of a plurality of openings and a plurality of projections, and the complementary mounting structures include the other of the plurality of openings and the plurality of projections.

13. The vehicle roof assembly according to claim 3, wherein
the mounting slot and the mounting flange are defined so that the mounting flange extends through the mounting slot in a direction transverse to a bottom-facing surface of the vehicle roof structure.

14. The vehicle roof assembly according to claim 3, wherein
the mounting slot and the mounting flange are defined so that the mounting flange extends through the mounting slot in a substantially horizontal direction.

15. The vehicle roof assembly according to claim 3, wherein
the movable member is a shade and the accessory frame is a shade frame with a driving mechanism disposed at the first frame end that moves the shade between the retracted position and the extended position.

16. A method for installing an accessory frame to a vehicle roof structure in which the accessory frame includes a movable member that is coupled to the accessory frame and that moves between a first position and a second position, the method comprising:
positioning the accessory frame in a pre-installation position in which a mounting flange of a first end of the accessory frame engages a mounting slot of the vehicle roof structure, the positioning including positioning the mounting flange in contact with a portion of the vehicle roof structure adjacent to the mounting slot when the accessory frame is in the pre-installation position;
pivoting the accessory frame with respect to the vehicle roof structure via contact between the mounting flange and the portion of the vehicle roof structure adjacent to the mounting slot from the pre-installation position to an installed position; and
securing a mounting structure of the vehicle roof structure to a complementary mounting structure of the accessory frame when the accessory frame is in the installed position, the securing including freeing the mounting flange from contact with the portion of the vehicle roof structure adjacent to the mounting slot when the accessory frame is in the installed position.

17. A method for installing an accessory frame to a vehicle roof structure in which the accessory frame includes a movable member that is coupled to the accessory frame and that moves between a first position and a second position, the method comprising:

positioning the accessory frame in a pre-installation position in which a mounting slot of a first end of the accessory frame engages a mounting flange of the vehicle roof structure, the positioning including positing the mounting flange in contact with a portion of the first end of the accessory frame adjacent to the mounting slot when the accessory frame is in the pre-installation position;

pivoting the accessory frame with respect to the vehicle roof structure via contact between the mounting flange and the portion of the first end of the accessory frame adjacent to the mounting slot from the pre-installation position to an installed position; and securing a mounting structure of the vehicle roof structure to a complementary mounting structure of the accessory frame when the accessory frame is in the installed position, the securing including freeing the mounting flange from contact with the portion of the first end of the accessory frame adjacent to the mounting slot when the accessory frame is in the installed position.

18. The vehicle roof assembly according to claim 3, wherein the first roof section of the vehicle roof structure includes a second mounting structure and the first frame end of the accessory frame includes a second complimentary mounting structure; and the mounting flange and the mounting slot are spaced further inward than the second mounting structure and the second complimentary mounting structure from the distal end of the first frame end in the longitudinal direction of the accessory frame when the accessory frame is in the installed position.

19. The vehicle roof assembly according to claim 3, wherein the first roof section of the vehicle roof structure includes one of a second mounting structure and a second complimentary mounting structure;

the first frame end of the accessory frame includes the other of the second mounting structure and the second complimentary mounting structure; and the second mounting structure includes a fastener that extends vertically when the accessory frame is in the installed position and the second complimentary mounting structure includes an elongated slot that extends horizontally when the accessory frame is in the installed position, the fastener extending at least partially through the elongated slot when the accessory frame is in the pre-installation position.

20. The vehicle roof assembly according to claim 6, wherein the first roof section of the vehicle roof structure includes a second mounting structure and the first frame end of the accessory frame includes a second complimentary mounting structure; and the mounting flange and the mounting slot are spaced further inward than the second mounting structure and the second complimentary mounting structure from the distal end of the first frame end in the longitudinal direction of the accessory frame when the accessory frame is in the installed position.

21. The vehicle roof assembly according to claim 6, wherein the first roof section of the vehicle roof structure includes one of a second mounting structure and a second complimentary mounting structure;

the first frame end of the accessory frame includes the other of the second mounting structure and the second complimentary mounting structure; and the second mounting structure includes a fastener that extends vertically when the accessory frame is in the installed position and the second complimentary mounting structure includes an elongated slot that extends horizontally when the accessory frame is in the installed position, the fastener extending at least partially through the elongated slot when the accessory frame is in the pre-installation position.

* * * * *